UNITED STATES PATENT OFFICE.

ALBRECHT SCHMIDT, OF HÖCHST-ON-THE-MAIN, GERMANY, ASSIGNOR TO FARB-WERKE VORM. MEISTER LUCIUS & BRÜNING, OF HÖCHST-ON-THE-MAIN, GERMANY, A CORPORATION OF GERMANY.

SYNTHETIC INDIGO IN A NEW FORM AND PROCESS OF MAKING SAME.

1,058,020.　　　Specification of Letters Patent.　　Patented Apr. 1, 1913.

No Drawing.　　Application filed August 15, 1910.　Serial No. 577,200.

*To all whom it may concern:*

Be it known that I, ALBRECHT SCHMIDT, Ph. D., chemist, a citizen of the Empire of Germany, residing at Höchst-on-the-Main, Germany, have invented certain new and useful Improvements in Synthetic Indigo in a New Form and Process of Making Same, of which the following is a specification.

In U. S. Patent application Ser. No. 576,703 filed August 11, 1910 I have described a process according to which a new form of synthetic indigo is obtained by causing indigo to form in presence of aminosulfonic acids containing residues derived from the benzyl group. Now I have further found that the same property, namely that of producing indigo in this form, must be attributed to all aromatic acids (sulfonic acids, carboxylic acids). For instance the following acids exercise a particularly energetic action in this regard, viz: 1.2-naphtholsulfonic acid, 2.6, 1.7, 2.7 or 2.8 naphtholsulfonic acid, dimethylanilin-p-sulfonic acid, 1.5-naphthalindisulfonic acid, 2-chloro-1-toluene-4-sulfonic acid, p-phenolsulfonic acid, $C_6H_5CH_2SO_3Na$, phenanthrenesulfonic acids, sulfonic acids derived from carbazole, anthracene, etc., p- and m-sulfobenzoic acids, aryl-oxy-acetic acids, benzylanthranilic acid, arylglycins and diglycins, salicylic acid and the like. But also other aromatic acids of simpler constitution show a remarkable action if employed in larger quantities.

The formation and separation of the new indigo may be effected in the manner described in my specified application, namely, by subjecting indol derivatives which are closely related to indigo and capable of directly yielding indigo, to indigo-producing conditions. By the term "indol derivatives which are closely related to indigo and capable of directly yielding indigo", I primarily mean the indigo salts, both those of the dyestuff itself and of its leuco compounds. Therefore the indigo is produced by dissociating indigo salts, for example, indigo-sulfate, with water, in presence of the above mentioned acids or their salts, whereby the new indigo is liberated; or by precipitating with air or another oxidizing agent solutions or pastes consisting of indigo-leuco salts (indoxyl-alkali, indigo-white and the like) in presence of the above-mentioned acids or their salts.

The following examples serve to illustrate the process but are not intended to limit the process to these methods of operation.

Example 1: 200 parts by weight of indigo are introduced into 2000 parts of sulfuric acid of 60° Bé., in which there have been previously dissolved or suspended about 100 (or more or less) parts of 1.2-naphtholsulfonic salt, or, for instance, a salt of p-sulfobenzoic acid, phthalic acid, phenanthrenesulfonic acid, etc. After having stirred the mass for about one-fourth or one-half hour it is poured on ice. The operation may also be carried out in inverse order by first well cooling the mixture of indigosulfate, aromatic acid and sulfuric acid and gradually adding to it diluted sulfuric acid or ice, either of these agents dissociating the indigo-sulfate into indigo with little evolution of heat. The dissociation may also be effected in the presence of other bodies, for instance of starch or any other insoluble or soluble carbohydrate or a similar body, such as glycerin; further, in the presence of voluminous bodies such as hydrates of silicic acid, etc. These bodies better retain the colloid-like form of the indigo, in which it can be easily made into a paste, and prevent it from changing into a form in which it can only with difficulty be moistened and made into a paste with water, and is therefore more difficultly reducible. The finely-divided acid dyestuff-paste thus obtained is passed through the filter-press and washed until the sulfuric acid is removed from the press-cake; the press-cake may then be further moderately washed out or there may be added to it caustic soda lye, ammonia or a similar neutralizing agent until it becomes neutral or slightly alkaline. The product thus obtained possesses the property of being most easily reduced even by reducing agents of very weak action; thus it is reduced, in a quite extraordinarily quick and easy manner, in the cold glucose-vat (fermentation-vat). Also in other respects the product substantially possesses the same properties as that described in my aforesaid U. S. Patent application.

Example 2: One kg. of a fusion of indigo of 20% strength, or a corresponding quantity of alkali salt of indoxyl, or an indigo-vat, is diluted with about 1–5 kg. of water with addition of about 50 gr. (or more or less as the case may be) of the salts of the above mentioned acids, and this solution is precipitated with air or another oxidizing agent.

The above described press-cakes may be allowed to dry in the air or they may be dried up into lumps by exposing them to external heat; furthermore the water may be caused to evaporate *in vacuo* or by exposing the mass to higher temperature so as to obtain a powder or small lumps; moreover the still moist or dry powder may be again pressed so as to form lumps. Finally, there may be added inorganic or organic substances suitable for maintaining the indigo in the colloid form, such as: china-clay, kaolin, or the like, or glycerin, sugar-like substances, starch, etc.

The new product is broadly claimed in my application Ser. No. 576,703, filed August 11, 1910. The dry product, specifically in the form of powder, is claimed in my application Ser. No. 708,481, filed July 9, 1912.

Having now described my invention, what I claim is:

1. The process of making a new form of synthetic indigo, which consists in producing indigo from indol derivatives which are closely related to indigo and capable of directly yielding indigo, in the presence of aromatic acids.

2. The process of making a new form of synthetic indigo, which consists in producing indigo from indigo salts in the presence of aromatic acids.

3. The process of making a new form of synthetic indigo, which consists in producing indigo from leuco-indigo salts in the presence of aromatic acids.

4. The process of making a new form of synthetic indigo, which consists in producing indigo from indol derivatives which are closely related to indigo and capable of directly yielding indigo, in presence of aromatic acids and solid diluents.

5. As a new product, the lumps obtained from indigo in the new form, which new form is extremely easily and quickly reducible in slightly reducing agents and, when made up into a paste with water, yields a deep blue difficultly-depositing liquid, which on being put on a filter gives a blue filtrate, and in which when seen through a microscope no more crystalline indigo-particles can be discerned.

6. As a new product, the mixture of solid diluents with indigo in the new form, which new form is extremely easily and quickly reducible in slightly alkaline reducing agents and, when made up into a paste with water, yields a deep blue difficultly-depositing liquid, which, on being put on a filter, gives a blue filtrate and in which, when seen through a microscope, no more crystalline indigo-particles can be discerned.

In testimony whereof, I affix my signature in presence of two witnesses.

ALBRECHT SCHMIDT.

Witnesses:
JEAN GRUND,
CARL GRUND.